United States Patent
Ochiai

(10) Patent No.: US 7,201,198 B2
(45) Date of Patent: Apr. 10, 2007

(54) TIRE FOR MOTORCYCLE

(75) Inventor: Kiyoshi Ochiai, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 221 days.

(21) Appl. No.: 10/815,750

(22) Filed: Apr. 2, 2004

(65) Prior Publication Data
US 2004/0221938 A1 Nov. 11, 2004

(30) Foreign Application Priority Data
May 8, 2003 (JP) .............................. 2003-129816

(51) Int. Cl.
*B60C 9/02* (2006.01)
*B60C 9/18* (2006.01)
*B60C 9/22* (2006.01)
*B60C 13/00* (2006.01)
*B60C 15/00* (2006.01)

(52) U.S. Cl. ...................... 152/531; 152/533; 152/538; 152/546; 152/554; 152/555

(58) Field of Classification Search ................ 152/526, 152/531, 555, 533, 538, 546, 554
See application file for complete search history.

(56) References Cited

U.S. PATENT DOCUMENTS

| 3,509,930 A | * | 5/1970 | Mirtain .................. 152/555 |
| 3,831,656 A | * | 8/1974 | Senger et al. ........... 152/531 X |
| 4,573,511 A | | 3/1986 | Kabe et al. |
| 4,854,362 A | * | 8/1989 | Carolla et al. ........... 152/554 |
| 5,647,929 A | | 7/1997 | Suzuki |

FOREIGN PATENT DOCUMENTS

JP 05-246210 A 9/1993

* cited by examiner

*Primary Examiner*—Adrienne C. Johnstone
(74) *Attorney, Agent, or Firm*—Birch Stewart Kolasch & Birch, LLP

(57) ABSTRACT

A tire (10) includes a carcass (14). The carcass (14) has a first ply (17) and a pair of second plies (18) and (19). The first ply (17) is wound around a bead core (22) and is folded back outward. This portion constitutes an overlapping portion (24). The second plies (18) and (19) are inserted in the overlapping portion (24) and are extended along the first ply (17). A height (h1) of the overlapping portion (24) is set to be 50% or more of a height (H) of the first ply (17). A minimum height (h2) of the second plies (18) and (19) is set to be 8% or more of the height (H) of the first ply. A width (J) of a belt (15) is set to be 80% or more of a width (W) of the tire.

7 Claims, 3 Drawing Sheets

TIRE FOR MOTORCYCLE

This nonprovisional application claims priority under 35 U.S.C. § 119(a) on Patent Application No. 2003-129816 filed in Japan on May 8, 2003, which is herein incorporated by reference.

BACKGROUND OF THE INVENTION

1. Field of the Invention

The present invention relates to a structure of a tyre for a motorcycle.

2. Description of the Related Art

In a motorcycle, a body is greatly inclined during cornering. A tyre for the motorcycle requires a cornering stability in addition to a straight running stability. Conventionally, the tyre for the motorcycle has been variously improved in order to meet these requirements. In order to enhance the straight running stability and cornering stability of the tyre for the motorcycle, a structure of a carcass constituting the framework of the tyre and a structure of a belt reinforcing the carcass particularly play an important part.

In general, a carcass ply of the tyre for a motorcycle has a (2–0) structure, a (1+1–0) structure or a (1–1–0) structure. The carcass ply is reinforced by a belt ply. A typical belt ply has a belt cord wound upon an outside of the carcass ply (an outside in a radial direction of the tyre) in a circumferential direction of the tyre. In the belt ply, a band-shaped sheet including the belt cord is wound spirally upon the outside of the carcass ply (see Japanese Laid-Open Patent Publication No. 5-246210).

In the belt ply having such a structure, a force for constrainting the carcass ply is great. Therefore, the amount of deformation of the tyre for the motorcycle is small during high speed straight running. As a result, the straight running stability of the tyre for the motorcycle is increased. In addition, the band-shaped sheet constituting the belt ply is wound at approximately 0 degree with respect to the circumferential direction of the tyre, and the belt cord is arranged in almost the circumferential direction of the tyre. Accordingly, the tyre has a high shock absorption during straight running and a ride comfort can also be enhanced.

On the other hand, the belt cord is arranged at approximately 0 degree (which is equal to or smaller than 5 degrees) with respect to the circumferential direction of the tyre. Therefore, the tyre for the motorcycle has a small side force which is generated during cornering. For this reason, a high speed cornering performance tends to be deteriorated. In order to solve this problem, a cut ply is provided on the inside or outside of the belt ply in some cases. Consequently, a side stiffness of the tyre can be enhanced and the high speed cornering performance of the tyre can be improved.

In the case in which the cut ply is provided on the inside or outside of the belt ply, however, the stiffness of a tread portion of the tyre is greatly increased. For this reason, there is a problem in that the ride comfort is deteriorated and a weight of the tyre is increased.

SUMMARY OF THE INVENTION

The present invention has been made in such a background. It is an object of the present invention to provide a tyre for a motorcycle in which an increase in a weight of the tyre can be suppressed and a straight running stability and a cornering stability can be enhanced.

The tyre for the motorcycle according to the present invention has the following structure.

(1) A tyre for a motorcycle comprises a first ply wound around a bead core from an inside toward an outside in an axial direction of the tyre, thereby forming a pair of overlapping portions, a pair of second plies provided in an insertion state in the overlapping portions and extended along the first ply by a predetermined length, and a belt ply having a belt cord wound in a circumferential direction of the tyre at an outside in a radial direction of the tyre of the first ply and the second ply.

(2) The first ply includes a first ply cord, and the first ply cord is provided at an angle of 65 to 88 degrees with respect to a tyre equator plane.

(3) A height h1 of the overlapping portion is set to be 50% or more of a height H of the first ply.

(4) The second ply includes a second ply cord, and the second ply cord is provided at an angle of −45 to −88 degrees with respect to the tyre equator plane.

(5) A minimum height h2 of the second ply is set to be 8% or more of the height H of the first ply.

(6) A width J of the belt ply is set to be 80% or more of a width W of the tyre.

According to this structure, the first ply is wound upon the bead core and is folded back from an inside toward an outside in the axial direction of the tyre. Consequently, a pair of overlapping portions is formed. A pair of second plies is provided. Each of the second plies is inserted in each of the overlapping portions and is provided along the first ply. These second plies are extended along the first ply by the predetermined length. Therefore, second plies are provided symmetrically with respect to the tyre equator plane in order to cover only the predetermined portion of the first ply. The belt ply is provided to cover the first ply and the second ply.

The structure of the carcass corresponds the (1+1–0) structure in which only the central part of a second ply is lost. In the tyre, the stiffness of the tread portion can be prevented from being excessively increased. Consequently, the stiffness of only a sidewall portion and a shoulder portion can be enhanced. Moreover, an increase in the weight of the tyre can be suppressed. In addition, since the first ply cord of the first ply is provided at an angle of 65 to 88 degrees with respect to the tyre equator plane and the second ply cord of the second ply is provided at an angle of −45 to −88 degrees with respect to the tyre equator plane, both of them cross each other. Furthermore, the height h1 of the overlapping portion is set to be 50% or more of the height H of the first ply and the minimum height h2 of the second ply is set to be 8% or more of the height H of the first ply, and the width J of the belt ply is set to be 80% or more of the width W of the tyre. Therefore, only the stiffness of the sidewall portion and the shoulder portion can be enhanced effectively.

As described above, in the present invention, the stiffness of the tread portion can be prevented from being excessively increased. Consequently, a disturbance absorption during straight running can be increased and a ride comfort can also be enhanced in addition to a straight running stability. In addition, the second ply is provided in a proper region. Consequently, the stiffness of the sidewall portion and the shoulder portion can be enhanced. As a result, an increase in the weight of the tyre for a motorcycle can be suppressed, and furthermore, a high speed cornering performance can be enhanced.

DESCRIPTION OF THE PREFERRED EMBODIMENTS

The present invention will be described below in detail based on a preferred embodiment with reference to the drawings.

Figure 1:
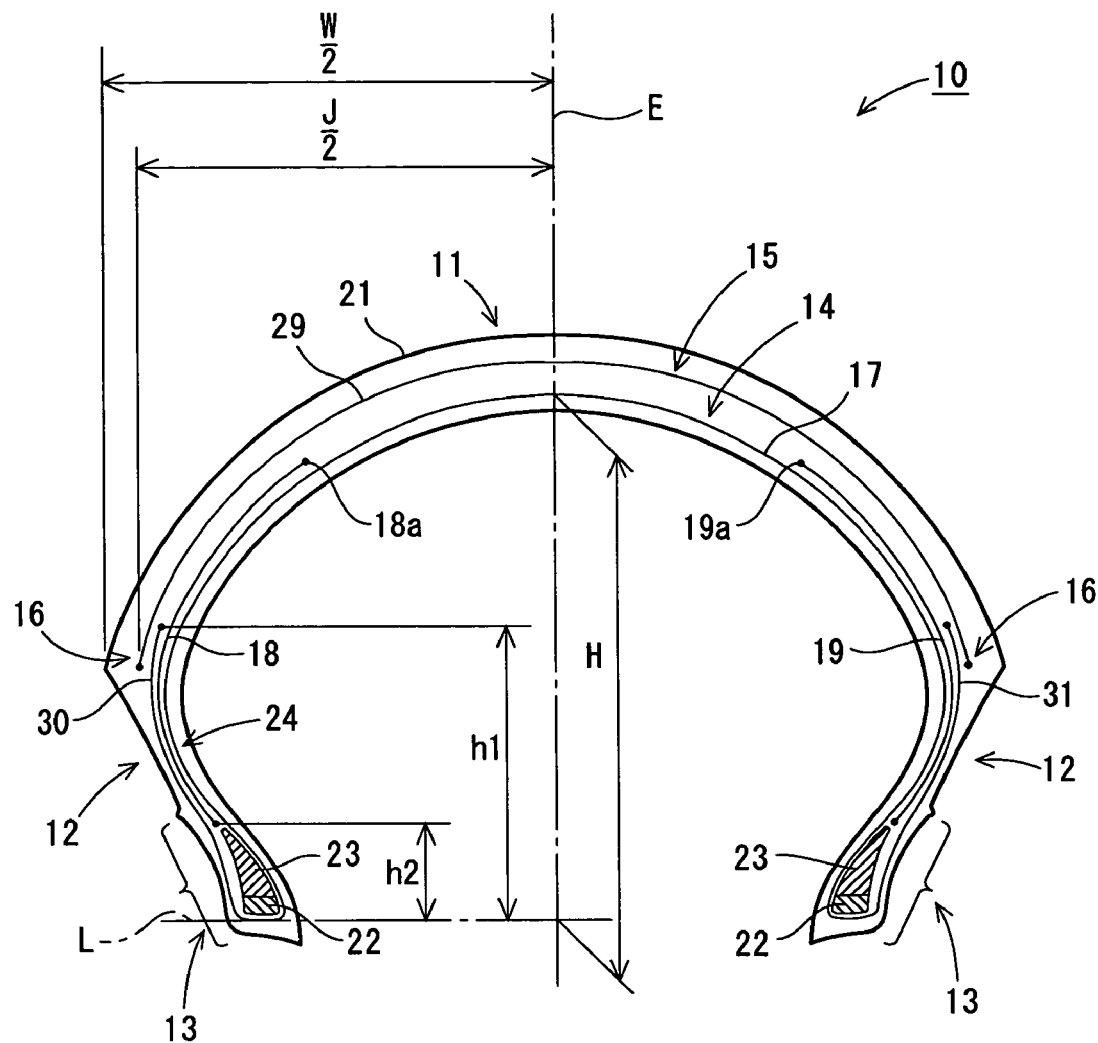
FIG. 1 is a sectional view showing the main part of the structure of a tyre for a motorcycle according to an embodiment of the present invention.

FIG. 1 shows the structure of a tyre 10 for a motorcycle according to an embodiment of the present invention. FIG. 1 illustrates a section taken along a plane which passes through the center of the tyre 10 and is orthogonal to an equator plane E of the tyre 10. In FIG. 1, a vertical direction indicates a radial direction of the tyre 10 and a transverse direction indicates an axial direction of the tyre 10.

The tyre 10 takes an almost symmetrical shape around the equator plane E excluding at read pattern. The tyre 10 comprises a tread 11, a pair of shoulders 16 linked continuously to both sides of the tread 11 (both sides in the axial direction of the tyre 10), a pair of sidewalls 12 and a pair of beads 13 which are linked continuously thereto, a carcass 14, and a belt 15.

The dimension of each portion for the tyre 10 is measured in such a state that the tyre 10 is incorporated into a normal rim and is filled with air to have a normal internal pressure. In this specification, the normal rim indicates a rim provided by a standard system including standards on the tyre 10. A "standard rim" in JATMA standards, a "Design Rim" in TRA standards and a "Measuring Rim" in ETRTO standards are included in the normal rim. In this specification, a normal internal pressure implies an internal pressure provided by a standard system including standards on the tyre 1. A "maximum air pressure" in the JATMA standards, a "maximum value" described in "TIRE LOAD LIMITS AT VARIOUS PRESSURE" in the TRA standards, and "INFLATION PRESSURE" in the ETRTO standards are included in the normal internal pressure.

The tread 11 is formed of a cross-linked rubber, and a tread surface 21 is formed like an arch to be an outward convex portion in a radial direction. When the motorcycle is to be turned, generally, a driver inclines the motorcycle inward in a turning direction. At this time, the tyre comes in contact with a road surface at a camber angle. A camber thrust is generated on the contact surface of the tyre against a centrifugal force generated during the turn of the motorcycle, and the motorcycle carries out a stable turn by this force. In order to generate a stable camber thrust, the tread surface 21 is formed to draw an arch as shown in FIG. 1. The tread surface 21 comes in contact with the road surface. A tread pattern (not shown) having a groove portion and a land portion is formed on the tread surface 21.

The sidewall 12 is continuously linked to the tread 11 and is extended inward in a radial direction from both ends of the tread 11. In other words, the sidewall 12 is bent inward in the radial direction from the tread 11 and the shoulder 16 is constituted by a portion in which both are provided continuously. The sidewall 12 and the shoulder 16 are also formed of a cross-linked rubber. The sidewall 12 absorbs a shock from the road surface by a flexure. The sidewall 12 prevents the carcass 14 from being externally damaged. Furthermore, the shoulder 16 can enhance the stiffness (particularly, the side stiffness) of the tyre 10.

The bead 13 is continuously formed with the sidewall 12. The bead 13 includes a bead core 22 and a bead apex 23 extended outward in a radial direction from the bead core 22. The bead core 22 is formed annularly and is formed by a plurality of non-extensible wires (typically, wires formed of steel). The bead apex 23 is formed like a taper which is tapered outward in the radial direction, and is formed of a cross-linked rubber.

The carcass 14 includes the first ply 17 and the second plies 18 and 19. As shown in FIG. 1, the first ply 17 is formed along the tread 11, the sidewall 12 and the bead 13. Both ends 30 and 31 of the first ply 17 are wound from an inside of the bead core 22 toward an outside thereof, and furthermore, are extended along the sidewall 12 by a predetermined length. In other words, the first ply 17 is wound around the bead core 22 and is thereby folded back in the position of the bead core 22, and the end 30 of the first ply 17 is provided along the first ply 17. Accordingly, a folded portion 24 (an overlapping portion) has a structure in which the first ply 17 overlaps.

A height h1 of the folded portion 24 (hereinafter referred to as the "overlapping portion 24") is set to be 52% of a height H of the first ply 17 in the present embodiment. Indeed, it is sufficient that the dimension h1 has a relationship of h1 ≧0.5 H. The dimension h1 is preferably 52% to 68% of the dimension H and more preferably 56% to 65% of the dimension H. The height h1 of the overlapping portion 24 implies a winding height in a radial direction of the first ply 17 based on a bead base line L. The height H of the first ply 17 implies a maximum height in the radial direction of the first ply 17 based on the bead base line L.

As shown in FIG. 1, the second ply 18 is provided along the first ply 17 from the inside of the overlapping portion 24. More specifically, the second ply 18 is provided in an insertion state in the overlapping portion 24. The second ply 18 is extended along the first ply 17 by a predetermined length and is formed in a region from the sidewall 12 to the shoulder 16. A minimum height h2 of the second ply 18 is set to be 30% of the height H of the first ply 17 in the present embodiment. Indeed, it is sufficient that the dimension h2 has a relationship of h2≧0.08H. The dimension h2 is preferably 12% to 35% of the dimension H and more preferably 20% to 35% of the dimension H.

The second ply 19 has the same structure as that of the second ply 18 and is provided symmetrically with the second ply 18 to the equator plane E. The minimum height h2 of the second plies 18 and 19 implies a height of the lower ends of the second plies 18 and 19 based on the bead base line L. In other words, the minimum height h2 of the second plies 18 and 19 implies a minimum height in the radial direction of the second plies 18 and 19 based on the bead base line L.

The second plies 18 and 19 are extended along the tread 11 as shown in FIG. 1, respectively. In the present embodiment, the positions of upper ends 18a and 19a of the second plies 18 and 19 are set in such a manner that a dimension therebetween is 52 mm. The dimension between the upper ends 18a and 19a is set to be 40 mm or more and 80% or less of a tyre width W.

The belt 15 is provided along the tread 11 outward in the radial direction of the carcass 14. The belt 15 serves to tighten and reinforce the first ply 17 and the second plies 18 and 19 in the radial direction. A width J of the belt 15 is set to be 85% of the width W in the present embodiment. Indeed, it is sufficient that the dimension J has a relationship of J≧0.8 W. The dimension J is preferably 82% to 90% of the dimension W and more preferably 84% to 88% of the dimension W. The width W is a maximum dimension in the axial direction of the tyre 10 and the width J is a maximum dimension in the axial direction of the belt 15.

Figure 2:
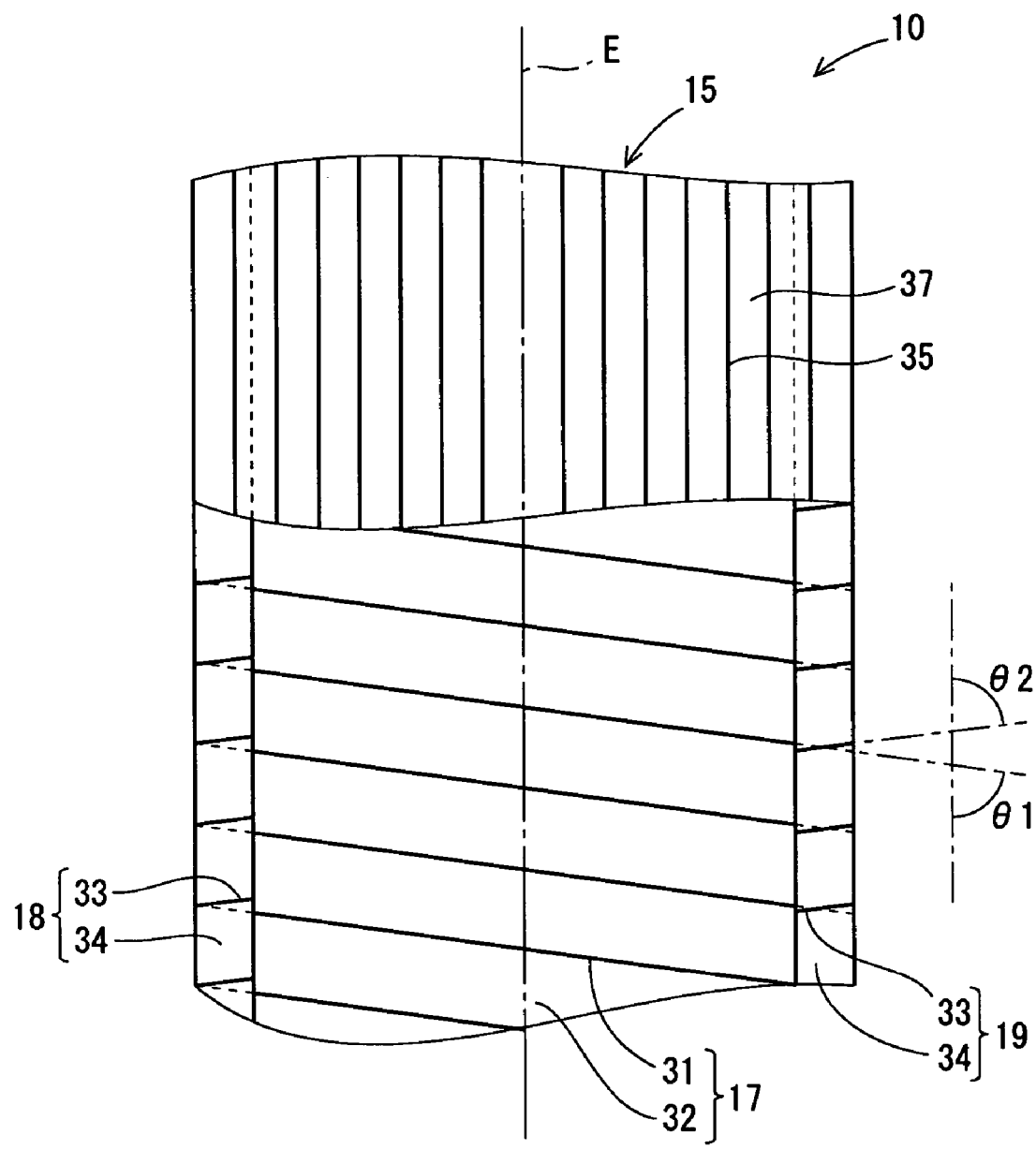
FIG. 2 is a plan view of the main part of the tyre shown in the FIG. 1.

FIG. 2 shows the section of the tyre 10 which is obtained by cutting through a phantom plane along the tread 11. As shown in FIG. 2, the second plies 18 and 19 are caused to overlap with both sides of the first ply. Moreover, the belt 15 is provided to cover them.

The first ply 17 includes a plurality of first ply cords 31. The first ply cord 31 is previously covered with a rubber sheet 32 and is thus aligned. When the tyre 10 is to be formed, the rubber sheet 32 is united with other portions. The first ply cord 31 is provided to cross the equator plane E (in the circumferential direction of the tyre 10) at an angle $\theta 1$. In the present embodiment, $\theta 1=75$ degrees is set. Indeed, $\theta 1$ is properly set within a range of 65 to 88 degrees and can be preferably set within a range of 65 to 75 degrees.

The second plies 18 and 19 include a plurality of second ply cords 33, respectively. The second ply cord 33 is previously covered with a rubber sheet 34 and is thus aligned. When the tyre 10 is to be formed, the rubber sheet 34 is united with other portions. The second ply cord 33 is provided to cross the equator plane E (in the circumferential direction of the tyre 10) at an angle $\theta 2$. In the present embodiment, $\theta 2=-40$ degrees is set. Indeed, $\theta 2$ is properly set within a range of $-40$ to $-88$ degrees and can be preferably set properly within a range of $-40$ to $-75$ degrees. Accordingly, the direction of the first ply cord 31 of the first ply 17 is set to be such a direction as to cross the second ply cords 33 of the second plies 18 and 19.

The belt 15 has a belt cord 35. The belt cord 35 is a single long member and is wound in a circumferential direction. In other words, the belt cord 35 is wound so that the first ply 17 and the second plies 18 and 19 are tightened and reinforced.

Figure 3:
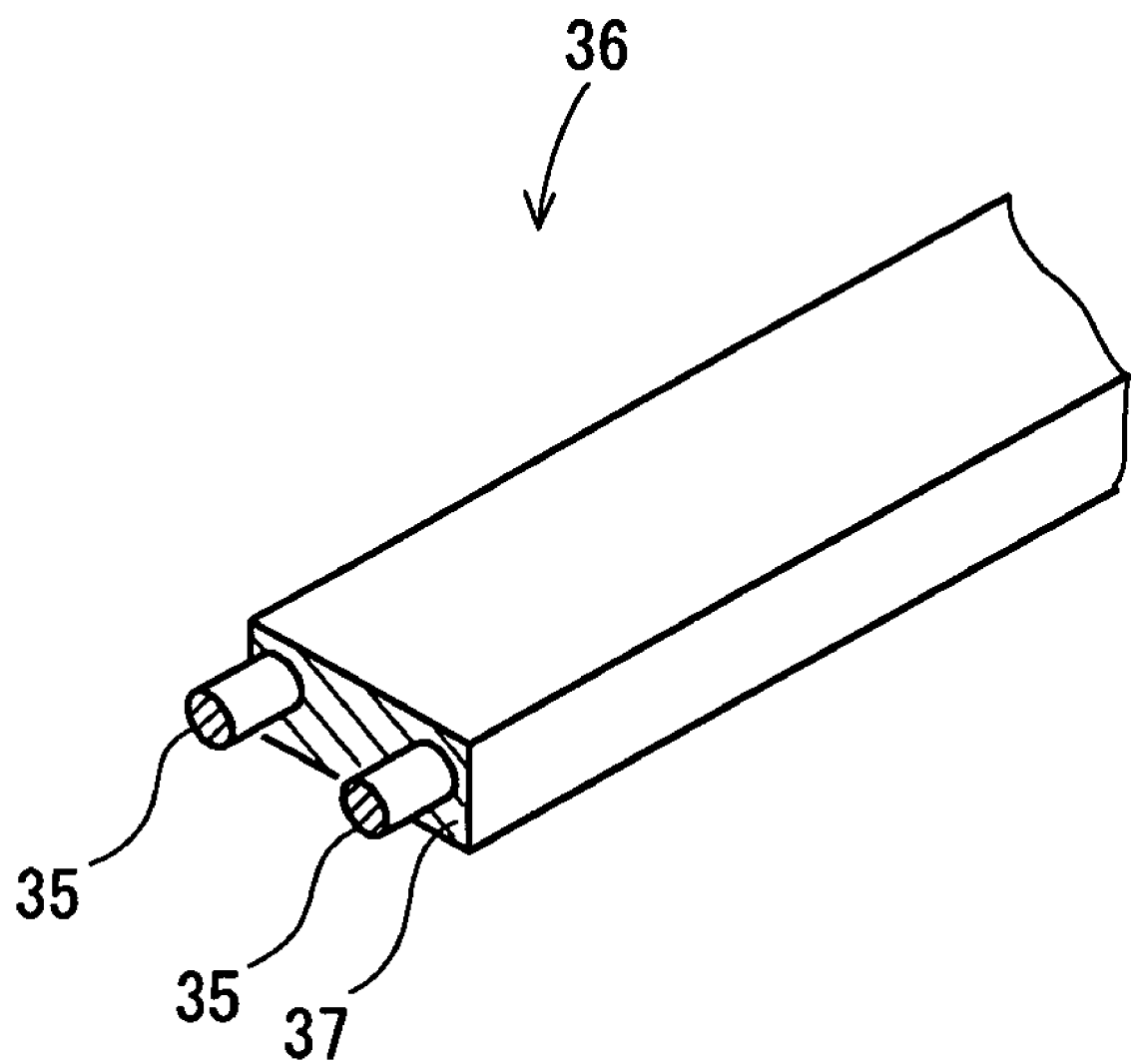
FIG. 3 is an enlarged perspective view showing the main part of a band-shaped sheet to be employed in the tyre shown in FIG. 1.

The belt 15 is constituted by a long and narrow band-shaped sheet. As shown in FIG. 3, a band-shaped sheet 36 is constituted by covering two belt cords 35 with a rubber sheet 37. The band-shaped sheet 36 is wound upon the first ply 17 and the second plies 18 and 19 in a circumferential direction. The band-shaped sheet 36 is wound spirally at an angle of 5 degrees or less (preferably approximately 0 degree) in the circumferential direction. When the tyre 10 is to be formed, the rubber sheet 37 is united with other portions.

The tyre 10 has a (1+1–0) structure and only the central part of the second ply of the (1+1–0) structure is lost. Accordingly, the stiffness of the tread 11 can be prevented from being excessively increased. Consequently, the stiffness of only the sidewall 12 and the shoulder 16 can be enhanced. As a result, a disturbance absorption during straight running can be increased and a ride comfort can also be enhanced in addition to a straight running stability. In addition, the second plies 18 and 19 are provided in the proper regions so that the stiffness of the sidewall 12 and the shoulder 16 can be enhanced. Consequently, an increase of the weight of the tyre 10 can be suppressed, and furthermore, a high speed cornering performance can be enhanced.

The first ply cord 31 crosses the second ply cords 33. Furthermore, the first ply 17, the second plies 18 and 19 and the belt 15 are set to have the dimensions described above. Therefore, only the stiffness of the sidewall 12 and the shoulder 16 can be enhanced effectively. As a result, the cornering performance of the tyre 10 during high speed straight running can be enhanced still more.

In addition, in the present embodiment, the width J of the belt 15 is set to be $J \geq 0.8$ W with respect to the tyre width W. Consequently, the first ply 17 and the second plies 18 and 19 are reliably reinforced by the belt 15 over almost the whole tread 11 and a change in the dimension of the tread 11 can be suppressed during the running of the motorcycle. In other words, it is possible to obtain an advantage that the deformation of the tread surface 21 can be suppressed during the running of the motorcycle and a uniform curved shape can be maintained.

EXAMPLES

The effects of the present invention will be apparent below from examples and the present invention should not be construed to be restricted based on the description of the examples.

Table 1 shows a performance evaluation of a tyre according to examples 1 to 10 of the present invention. The performance is shown as a result of a comparative test with a conventional example (a comparative example).

A motorcycle which is adapted for on-road is used in the test. A displacement of the motorcycle is 1000 cc. The size of the tyre according to each of the examples and the comparative examples is 120/70ZR17 on a front side and 190/50ZR17 on a rear side. The tyre according to each of the examples and the comparative examples is attached to a normal rim at a normal internal pressure. In each of the examples and the comparative examples, the tyre on the front side has an internal pressure of 250 kPa and the tyre on the rear side has an internal pressure of 290 kPa. The comparative test was carried out based on the subjective evaluation of a test rider for the handling stability, the cornering stability and the handling smoothness. The subjective evaluation is expressed in an index.

The details of a tyre according to each of the examples and the comparative examples are as follows.

Example 1

A tyre has a (1+1–0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. "50e" implies that 50 cords per unit length (5 cm) are included in a section which is orthogonal to the cord. An angle $\theta 1$ formed by the first ply cord in the circumferential direction of the tyre is 65 degrees. An angle $\theta 2$ formed by the second ply cord in the circumferential direction of the tyre is $-65$ degrees. The second ply has a lower end position (a value of h2/H×100) of 30% and the first ply has a winding position (a value of h1/H×100) of 50%.

Example 2

A tyre has a (1+1–0) structure and a second ply is divided. The cord of a first ply (1P) and that of a second ply (2P) are formed of a nylon fiber and a recovered with a cross-linked rubber. The cord of the first ply (1P) and that of the second ply (2P) have a size of 1400 dtex and a density of 50e. An angle $\theta 1$ formed by the first ply cord in the circumferential direction of the tyre is 75 degrees. An angle $\theta 2$ formed by the second ply cord in the circumferential direction of the tyre is $-75$ degrees. The second ply has a lower end position (a value of h2/H×100) of 8% and the first ply has a winding position (a value of h1/H×100) of 50%.

Example 3

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −75 degrees. The second ply has a lower end position (a value of h2/H×100) of 30% and the first ply has a winding position (a value of h1/H×100) of 50%.

Example 4

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −75 degrees. The second ply has a lower end position (a value of h2/H×100) of 30% and the first ply has a winding position (a value of h1/H×100) of 65%.

Example 5

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −45 degrees. The second ply has a lower end position (a value of h2/H×100) of 30% and the first ply has a winding position (a value of h1/H×100) of 50%.

Example 6

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −88 degrees. The second ply has a lower end position (a value of h2/H×100) of 30% and the first ply has a winding position (a value of h1/H×100) of 50%.

Example 7

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 88 degrees. An angle θ2 formed by the second ply cord in the circumferential direction of the tyre is −88 degrees. The second ply has a lower end position (a value of h2/H×100) of 30% and the first ply has a winding position (a value of h1/H×100) of 50%.

Comparative Example 1

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −75 degrees. The second ply has a lower end position (a value of h2/H×100) of 2% and the first ply has a winding position (a value of h1/H×100) of 50%.

Comparative Example 2

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −75 degrees. The second ply has a lower end position (a value of h2/H×100) of 30% and the first ply has a winding position (a value of h1/H×100) of 35%.

Comparative Example 3

A tyre has a (1+1−0) structure and a second ply is divided. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. An angle θ1 formed by the first ply cord in the circumferential direction of the tyre is 75 degrees. An angle θ2 formed by the second ply cord in the circumferential direction of the tyre is −40 degrees. The second ply has a lower end position (a value of h2/H×100) of 30% and the first ply has a winding position (a value of h1/H×100) of 50%.

Comparative Example 4

A tyre has a (1+1−0) structure. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. In the present comparative example, the second ply is integrated and is provided in a whole region of a tread portion and a shoulder portion. An angle θ1 formed by the first ply cord in the circumferential direction of the tyre is 65 degrees. An angle θ2 formed by the second ply cord in the circumferential direction of the tyre is −65 degrees. The second ply has a lower end position (a value of h2/H×100) of 30% and the first ply has a winding position (a value of h1/H×100) of 50%.

Comparative Example 5

A tyre has a (1+1–0) structure. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. In the present comparative example, the second ply is integrated and is provided in a whole region of a tread portion and a shoulder portion. An angle θ1 formed by the first ply cord in the circumferential direction of the tyre is 88 degrees. An angle θ2 formed by the second ply cord in the circumferential direction of the tyre is –88 degrees. The second ply has a lower end position (a value of h2/H×100) of 30% and the first ply has a winding position (a value of h1/H×100) of 50%.

Comparative Example 6

A tyre has a (2–0) structure. The cord of a first ply (1P) and that of a second ply (2P) are formed of a nylon fiber and are covered with a cross-linked rubber. The cord of the first ply (1P) and that of the second ply (2P) have a size of 1400 dtex and a density of 50e. In the present comparative example, the second ply is integrated and is provided in a whole region of a tread and a shoulder. An angle θ1 formed by the first ply cord in the circumferential direction of the tyre is 65 degrees. An angle θ2 formed by the second ply cord in the circumferential direction of the tyre is –65 degrees. The second ply has an end position of 20 mm and the first ply has a winding position (a value of h1/H×100) of 50%.

As shown in the Table 1, referring to the result of evaluation, each of the examples has more advantages than each of the comparative examples. More specifically, in the case in which there are conditions that the angle θ1 formed by the first ply cord in the circumferential direction of the tyre is 65 to 88 degrees and the angle θ2 formed by the second ply cord in the circumferential direction of the tyre is –45 to –88 degrees, and furthermore, the second ply has the lower end position (the value of h2/H×100) of 8% or more and the first ply has the winding position (the value of h1/H×100) of 50% or more, a performance such as the cornering stability is more excellent than that in each of the comparative examples.

What is claimed is:

1. A tyre for a motorcycle comprising:
    a first ply wound around a bead core from an inside toward an outside in an axial direction of the tyre, thereby forming a pair of overlapping portions;
    a pair of second plies provided in an insertion state in the overlapping portions and extended along the first ply by a predetermined length; and
    a belt ply having a belt cord wound in a circumferential direction of the tyre at an outside in a radial direction of the tyre of the first ply and the second ply, wherein the overlapping portion of the first ply overlaps the belt ply;
    wherein the first ply includes a first ply cord, and the first ply cord is provided at an angle of 65 to 88 degrees with respect to a tyre equator plane and a height h1 of the overlapping portion is set to be 52% to 68 of a height H of the first ply,
    the second ply includes a second ply cord, and the second ply cord is provided at an angle of –45 to –88 degrees with respect to the tyre equator plane and a minimum height h2 of the second ply is set to be 8% or more of the height H of the first ply, and
    a width J of the belt phi is set to be 80% or more of a width W of the tyre.

2. The tyre of claim 1, wherein the first ply cord is provided at an angle of 65 to 75 degrees.

3. The tyre of claim 1, wherein the height h1 of the overlapping portion is set to be 56% 65% of the height H of the first ply.

4. The tyre of claim 1, wherein the minimum height h2 of the second ply is set to be 12% to 35% of the height H of the first ply.

5. The tyre of claim 1, wherein the minimum height h2 of the second ply is set to be 20% to 35% of the height H of the first ply.

6. The tyre of claim 1, wherein the width J of the belt ply is set to be 82% to 90% of the width W of the tyre.

7. The tyre of claim 1, wherein the width J of the belt ply is set to be 84% to 88% of the width W of the tyre.

TABLE 1

|  | Tyre structure 1400dtx/50e | 1 P cord angle θ1 degree | 2 p specification | 2 P cord angle θ2 degree | 2 P lower end position h 2/H (%) | 1 p winding h 1/H (%) | General handling stability | General concerning stability | General cutting smoothness |
|---|---|---|---|---|---|---|---|---|---|
| Example 1 | 1 + 1 – 0 | 65 | Divided | –65 | 30 | 50 | 3.1 | 3.3 | 3.1 |
| Example 2 | 1 + 1 – 0 | 75 | Divided | –75 | 8 | 50 | 3.2 | 3.3 | 3.4 |
| Example 3 | 1 + 1 – 0 | 75 | Divided | –75 | 30 | 50 | 3.2 | 3.4 | 3.4 |
| Example 4 | 1 + 1 – 0 | 75 | Divided | –75 | 30 | 65 | 3.4 | 3.5 | 3.3 |
| Example 5 | 1 + 1 – 0 | 75 | Divided | –45 | 30 | 50 | 3.1 | 3.0 | 3.0 |
| Example 6 | 1 + 1 – 0 | 75 | Divided | –88 | 30 | 50 | 3.2 | 3.0 | 3.1 |
| Example 7 | 1 + 1 – 0 | 88 | Divided | –88 | 30 | 50 | 3.1 | 2.9 | 3.1 |
| Comparative Example 1 | 1 + 1 – 0 | 75 | Divided | –75 | 2 | 50 | 2.8 | 3.3 | 2.6 |
| Comparative Example 2 | 1 + 1 – 0 | 75 | Divided | –75 | 30 | 35 | 2.8 | 3.0 | 2.7 |
| Comparative Example 3 | 1 + 1 – 0 | 75 | Divided | –40 | 30 | 50 | 2.7 | 3.0 | 2.8 |
| Comparative Example 4 | 1 + 1 – 0 | 65 | Integrated | –65 | 30 | 50 | 2.7 | 3.3 | 2.9 |
| Comparative Example 5 | 1 + 1 – 0 | 88 | Integrated | –88 | 30 | 50 | 2.7 | 3.1 | 2.7 |
| Comparative Example 6 | 2 – 0 | 65 | Integrated | –65 | 20 mm | 50 | 2.5 | 2.9 | 2.6 |